(12) United States Patent
Jockel (10) Patent No.: US 8,678,501 B2
(45) Date of Patent: Mar. 25, 2014

(54) BACKREST FOLDING MECHANISM FOR A VEHICLE SEAT

(75) Inventor: Fabian Jockel, Braunschweig (DE)

(73) Assignee: Sitech Sitztechnik GmbH, Wolfsburg (DE)

( * ) Notice: Subject to any disclaimer, the term of this patent is extended or adjusted under 35 U.S.C. 154(b) by 0 days.

(21) Appl. No.: 13/531,770

(22) Filed: Jun. 25, 2012

(65) Prior Publication Data

US 2012/0256460 A1 Oct. 11, 2012

Related U.S. Application Data

(63) Continuation of application No. PCT/EP2010/007393, filed on Dec. 6, 2010.

(30) Foreign Application Priority Data

Dec. 24, 2009 (DE) .......................... 10 2009 060 356

(51) Int. Cl.
*B60N 2/20* (2006.01)
*B60N 2/235* (2006.01)

(52) U.S. Cl.
USPC .................................................. 297/378.12

(58) Field of Classification Search
USPC ........... 297/378.12, 378.13; 296/65.16, 69.09
See application file for complete search history.

(56) References Cited

U.S. PATENT DOCUMENTS

| 4,717,204 | A | * | 1/1988 | Tezuka | 297/362 |
| 4,887,864 | A | * | 12/1989 | Ashton | 297/375 |
| 5,662,396 | A | | 9/1997 | Reeder et al. | |
| 7,086,700 | B2 | * | 8/2006 | Habedank | 297/378.1 |
| 7,210,734 | B1 | * | 5/2007 | Yetukuri et al. | 297/61 |
| 7,963,604 | B2 | * | 6/2011 | Becker et al. | 297/341 |
| 2001/0028189 | A1 | * | 10/2001 | Klein | 297/378.12 |

FOREIGN PATENT DOCUMENTS

| DE | 199 16 709 C1 | 2/2000 |
| DE | 103 13 807 A1 | 9/2004 |
| JP | 2006 347463 A | 12/2006 |

* cited by examiner

*Primary Examiner* — David R Dunn
*Assistant Examiner* — Timothy J Brindley
(74) *Attorney, Agent, or Firm* — Muncy, Geissler, Olds & Lowe, P.C.

(57) ABSTRACT

A backrest folding mechanism for a vehicle seat is provided, that includes a backrest, which has an actuating element that is arranged remotely from the backrest and acts remotely on the backrest folding mechanism in order to unlock a locking and unlocking element of the backrest with respect to a retaining element on the bodywork that is connectable to the locking and unlocking element, after which the backrest can be moved from an initial position that is substantially vertical or slightly inclined into a folded position.

21 Claims, 5 Drawing Sheets

BACKREST FOLDING MECHANISM FOR A VEHICLE SEAT

This nonprovisional application is a continuation of International Application No. PCT/EP2010/007393, which was filed on Dec. 6, 2010, and which claims priority to German Patent Application No. DE 10 2009 060 356.5, which was filed in Germany on Dec. 24, 2009, and which are both herein incorporated by reference.

BACKGROUND OF THE INVENTION

1. Field of the Invention

The invention relates to a vehicle seat with a remotely unlockable backrest folding mechanism with, in particular a motor vehicle rear seat backrest with a one-part or multi-part folding backrest.

2. Description of the Background Art

From U.S. Pat. No. 5,662,396, a folding backrest is known for the rear seat of a vehicle seat that has a locking mechanism that can be remotely unlocked manually by means of a Bowden cable, wherein the unlocking proceeds from two actuating elements, wherein one actuating element is located in the region of a front seat and another actuating element is located in the region of the trunk. After remote unlocking, the rear seat backrest automatically folds forward onto the seat pan portion of the rear seat by means of a preloaded spring element. While a return to the vertical starting position in opposition to the spring force thereof is possible, it requires an increased application of force for the operator, since the spring force of the strong spring element must be overcome in addition to the weight of the rear seat backrest.

SUMMARY OF THE INVENTION

It is therefore an object of the invention to provide an alternative, improved backrest folding mechanism in which a backrest can be unlocked from a remote position, and can be folded from that position by means of a deliberate actuation by an operator. In an embodiment, it is possible to construct the backrest folding mechanism in such a manner that a backrest can be folded from a remote position, in principle even without the use of a preloaded spring element. For improved convenience, it should be possible to combine the backrest folding mechanism—which basically can be employed to fold the backrest without the use of a preloaded spring element—with a spring element to assist the folding.

It is important to note that large forces are usually required to fold backrests, since to some extent it is necessary to overcome frictional forces caused by lateral contact with adjacent components, especially in the region of the cushion, in addition to the gravitational forces that must be overcome. The forces required during backrest folding are thus not constant over the folding angle, and even fluctuate quite widely, and are very large in some places. Particularly for backrest folding mechanisms, which accomplish a folding with the aid of spring elements, such fluctuations with regard to the forces required can only be accounted for to a limited degree in the choice of spring elements. Either the spring element is designed to be too strong or designed to be too weak, with the result that if the spring element is designed to be too weak, the risk exists that the backrest may possibly get caught, for example against a side of a car body as a result of increased frictional forces in a cushion area that protrudes somewhat to the side.

The invention, in an embodiment, proceeds from a backrest folding mechanism for a vehicle seat with a backrest, in particular a one-part or multi-part rear seat backrest, which has an actuating element that is located at a distance from the backrest and that acts on the backrest folding mechanism in order to remotely unlock a locking and unlocking element of the backrest with regard to a retaining element on the body that stands in operative connection with the locking and unlocking element, after which the backrest can be brought from an initial position that is essentially vertical or slightly inclined from the vertical into a folded position.

According to an embodiment of the invention, provision is made that in a first unlocking step of the backrest, the displacement of the actuating element initially acts via a first Bowden cable on a derailleur located in the backrest, which simultaneously carries along a pulling element located between the derailleur and the locking and unlocking element and unlocks the backrest, still in its initial position, after which a further displacement of the actuating element in a second step, a backrest fold initiation step, continues to act on the derailleur via the Bowden cable such that the derailleur carries the backrest along beyond its vertical dead center point, with the result that the backrest is turned over into the folded position in a third folding step.

In an embodiment, the derailleur is a derailleur pulley that is located at the side of the backrest on an axle fixed to the car body and substantially perpendicular to the direction of travel, on which axle the backrest is also folded, and is arranged to be freely rotatable within certain limits relative to a car body and relative to the backrest.

To this end, the derailleur pulley firstly has a first, top slot in which a stud fixed with respect to the backrest engages, and also has a second, bottom slot in which a stud fixed with respect to the car body engages, wherein during the actuation of the backrest folding mechanism the studs each constitute stops on both sides in the associated slots, limiting the rotation of the derailleur pulley relative to the car body and relative to the backrest.

The first Bowden cable and a Bowden cable used as a pulling element can be arranged in detail as follows within the backrest folding mechanism.

The Bowden cable core of the first Bowden cable is connected via Bowden cable connections to the actuating element on the one hand and to the derailleur on the other hand, while the Bowden cable jacket of the first Bowden cable is fastened to the pivotable backrest via at least one Bowden cable attachment.

The Bowden cable core of the second Bowden cable is connected via Bowden cable connections to the locking and unlocking element on the one hand and to the derailleur on the other hand, while the Bowden cable jacket of the second Bowden cable is fastened to the pivotable backrest via at least one Bowden cable attachment.

In an embodiment of the invention, a lever is used as the actuating element that initiates the first two actuation steps, the actuation direction of this lever is freely selectable in three-dimensional space, and its actuation direction is independent of the desired direction of the unlocking motion of the locking and unlocking element relative to the retaining element and is also independent of the direction of fold initiation of the backrest, since the actuation of the actuating element acts on the derailleur, which is connected to the first Bowden cable, and the derailleur redirects the force and direction of force of the first Bowden cable to the locking and unlocking element via the derailleur and second Bowden cable, and redirects the force and direction of force of the first Bowden cable to the backrest via the studs engaging the slots in the derailleur.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The arrangement of a vehicle seat in a motor vehicle and its usual direction of travel determine the specifications of directions that follow. The x direction corresponds to the direction of travel and its opposite, the vertical direction in a vehicle is defined as the z direction, while the axes extending substantially perpendicular to the direction of travel lie in the y direction.

The direction of actuation of a lever 7 belonging to the backrest folding mechanism and used as an actuating element can be freely selected, as will be explained in detail later. As will become evident from the following description, the movement of the lever 7 has the result, independently of the lever's direction of motion, that a first Bowden cable 2 attached to the lever 7 is always pulled; by means of the other components of the backrest folding mechanism, this Bowden cable ensures that the backrest 4 is initially released for folding in a first unlocking step.

Figure 1:
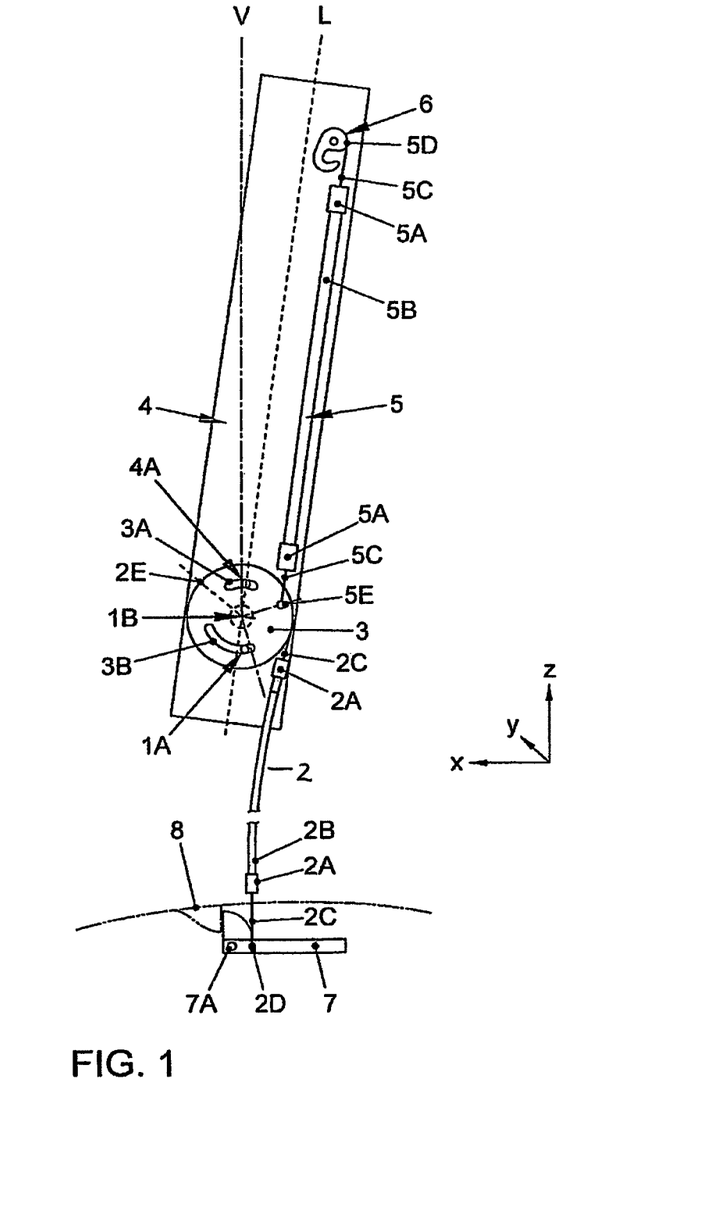
FIG. 1 is a schematic side view of a backrest with a remotely unlockable backrest folding mechanism.

FIG. 1 shows a first schematic side view of a backrest 4 with the remotely unlockable backrest folding mechanism in its starting position.

In its starting position, the backrest 4 is arranged such that its backrest axis L is tilted slightly to the rear with respect to the vertical axis V located in the z direction. The backrest 4 has a backrest fold axle 1B that is fixed to the car body and that, in the example shown, extends in the y direction perpendicular to the direction of travel. Starting from the position in FIG. 1, the backrest 4 can be pivoted beyond the vertical axis V into a horizontal position as in FIG. 4, and from there can be pivoted back to the starting position as in FIG. 1.

Before such a pivoting or folding of the backrest 4 is possible, a locking and unlocking element, a latch striker 6 in the exemplary embodiment, must be unlocked with respect to a stud or the like (which is not shown) on the car body. This latch striker 6 is located on the side of the backrest 4 in the exemplary embodiment.

To redirect the forces introduced for unlocking, initiating the folding, and turning over the backrest 4, the backrest 4 also has a derailleur in the form of a derailleur pulley 3, which is arranged to be freely rotatable on the axle 1B fixed to the body within certain limits in the clockwise and counterclockwise directions relative to the backrest 4. The possible angle of rotation of the derailleur pulley 3 is limited by a first and a second slot 3A, 3B.

A stud 4A that is fixed to the backrest and that limits the possible angle of rotation runs in the first, top slot 3A. A stud 1A that is fixed to the car body and that likewise limits the possible angle of rotation runs in the second, bottom slot 3B. With their ends in the slots 3A, 3B, the studs 1A, 4A form pins that project into the slots 3A, 3B and can constitute a stop at the applicable ends of the slots 3A, 3B. In the starting position as in FIG. 1, the stud 4A fixed to the backrest does not yet constitute a stop at one of the two ends of the first slot 3A. The stud 1A fixed to the body and located in the second, bottom slot 3B is also not fully at the right-hand end of the second slot 3B and thus does not yet constitute a stop.

Located on the derailleur pulley are a first Bowden cable 2 and a pulling element 5. Used as the pulling element 5 in the exemplary embodiment described is likewise a Bowden cable, which is referred to below as the second Bowden cable 5. A first Bowden cable 2 is connected to the lever 7 that is schematically represented beneath the backrest 4. The Bowden cable core 2C of the first Bowden cable 2 is connected on the one hand to the derailleur pulley 3 by a Bowden cable connection 2E. Here, the Bowden cable core 2C at the derailleur end passes in the manner of a pulley over the derailleur pulley 3, which has a slot on its end to guide the Bowden cable core 2C. On the other hand, the Bowden cable core 2C is connected on the lever end by the Bowden cable connection 2D to the lever 7.

Shown in both the top and bottom images in FIG. 1 is the particular Bowden cable attachment 2A by means of which the Bowden cable jacket 2B is arranged in a fixed position on the backrest 4.

The second Bowden cable 5 is located between the latch striker 6 and the derailleur pulley 3. The Bowden cable core 5C of the second Bowden cable 5 has a Bowden cable connection 5D to the latch striker 6 and a Bowden cable connection 5E to the derailleur pulley 3. By means of two Bowden cable attachments 5A, the second Bowden cable 5 is connected to the backrest 4. Between the two Bowden cable connections 5D, 5E, the Bowden cable core 5C runs in the Bowden cable jacket 5B until it exits a short distance from the latch striker 6 or the derailleur pulley 3.

The first and second Bowden cables 2, 5 thus engage the derailleur pulley 3 via the Bowden cable connections 2E, 5E.

In the bottom image of FIG. 1, the lever 7 is shown in its initial position consistent with the starting position of the backrest folding mechanism. The lever 7 likewise has an axis of rotation 7A so that an actuation of the first Bowden cable 2 through displacement of the Bowden cable connection 2D at the lever end takes place upon a pivoting of the lever 7 about the axis of rotation 7A. The lever 7 has a stop opposite a stop on the car body 8.

The latch striker 6 is arranged to be rotatable about its axis of rotation 7A with spring support, wherein the spring force of a spring element that is not shown always acts to push the latch striker 6 in the direction opposite its direction of unlocking.

The kinematic relationships provided in the individual steps for backrest folding are explained in detail below with reference to FIGS. 2, 3, and 4. In this explanation, the components and associated reference symbols that are relevant in each case for explaining the actuation steps are discussed.

Figure 2:
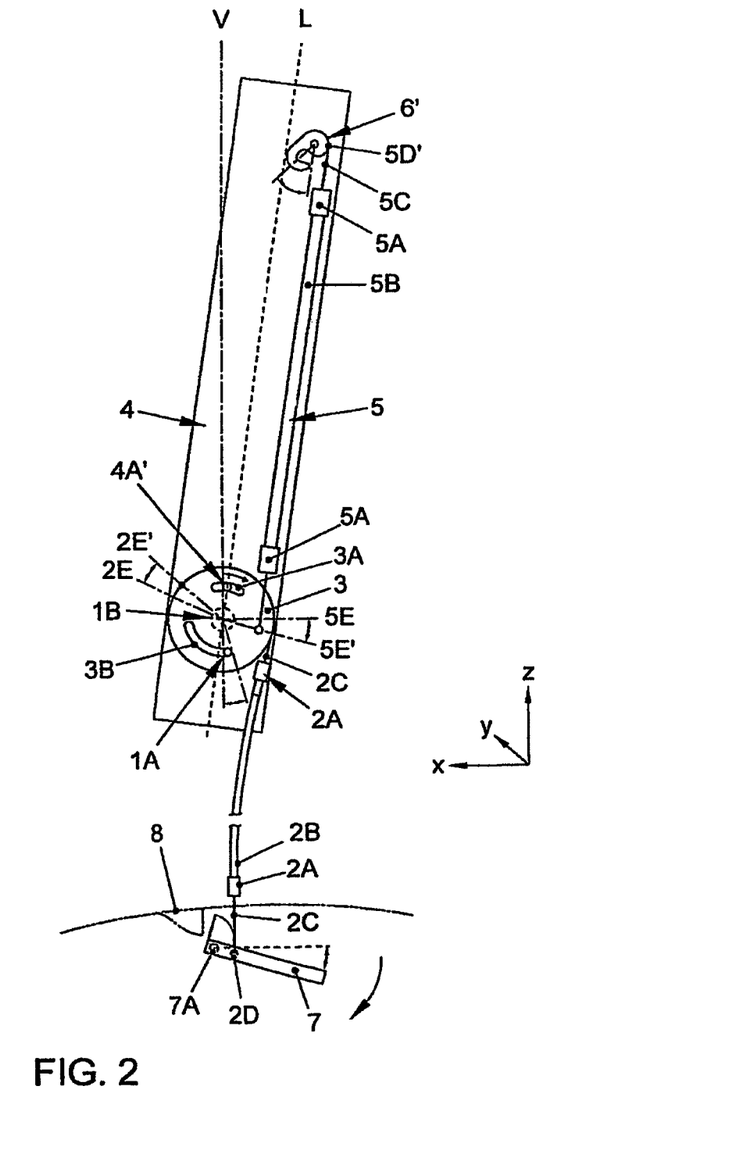
FIG. 2 is a schematic side view of the backrest with the remotely unlockable backrest folding mechanism after a first step for unlocking the backrest.

FIG. 2 likewise shows a schematic side view of the backrest 4 with the remotely unlockable backrest folding mechanism after a first step by means of which the unlocking of the backrest is initially accomplished.

The unlocking of the backrest 4 is accomplished in that the lever 7 is displaced about a predefinable angle (indicated by the double-headed arrow in the bottom image in FIG. 2) about the axis of rotation 7A. As a result of the actuation of the lever 7, the Bowden cable core 2C of the first Bowden cable 2 is pulled, as is likewise shown by the bottom image in FIG. 2. Since the Bowden cable core 2C is connected to the derailleur pulley 3 at the Bowden cable connection 2E, the derailleur pulley 3 rotates clockwise until the stud 1A fixed to the car body reaches the stop on the right in the second, bottom slot 3B. The derailleur pulley 3, and thus the right-hand end of the second slot 3B, is rotated clockwise through a predefinable angle.

At the same time, as FIG. 2 shows in the top image, the Bowden cable connection 2E of the first Bowden cable 2 moves into the position 2E' and the Bowden cable connection 5E of the second Bowden cable 5 into the position 5E', wherein this displacement corresponds to the pivot angle that is permitted by a gentle, low-force pulling of the lever 7 until establishment of the stop of the stud 1A at the right-hand end of the second slot 3B.

Due to the displacement of the Bowden cable connection 5E into the position 5E', the second Bowden cable 5 is pulled by the Bowden cable core 5C being pulled downward. As a result, the latch striker 6 pivots by a predefinable angle into the position 6', since the Bowden cable connection 5D is attached to the latch striker 6 in such a manner that the latch striker 6 is pivoted by the predefinable angle about its axis located in the y direction. The Bowden cable connection 5D travels into the position 5D', and the latch striker 6 moves with it into the position 6', accomplishing the unlocking of the backrest 4 with respect to the previously mentioned stud on the car body that is not shown.

Figure 3:
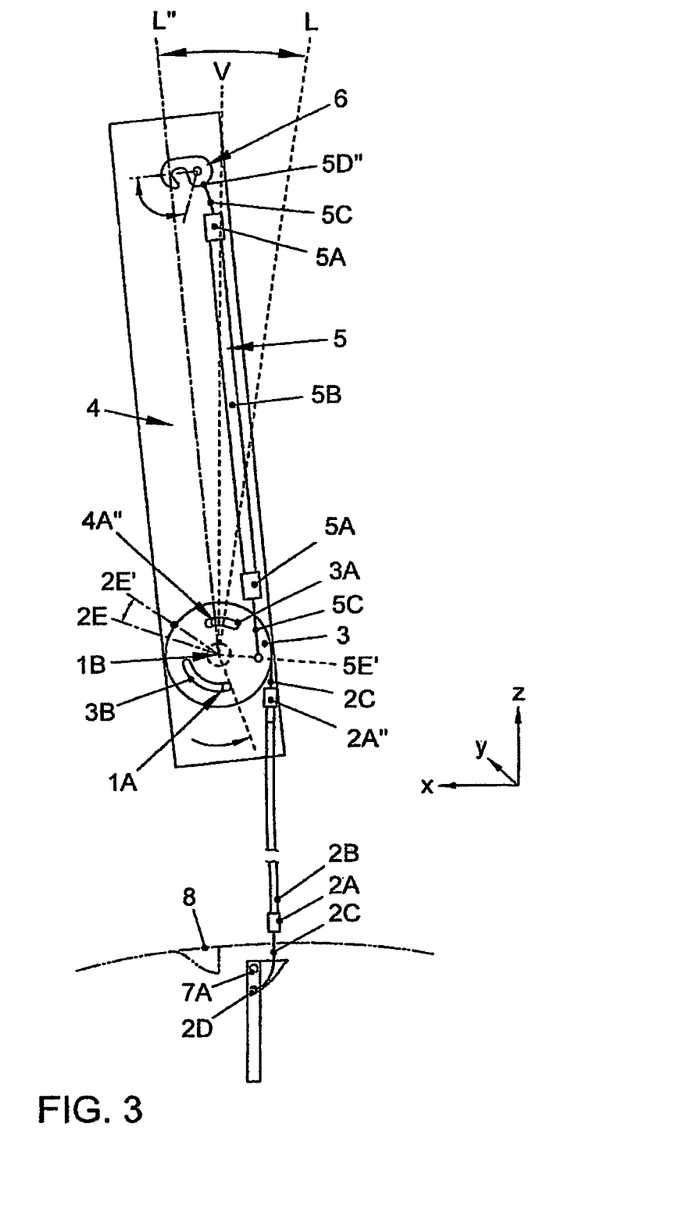
FIG. 3 is a schematic side view of the backrest with the remotely unlockable backrest folding mechanism after a second step for initiating folding of the backrest beyond its dead center point.

FIG. 3 shows the backrest 4 in another schematic side view with the remotely unlockable backrest folding mechanism after a second step, which permits the initiation of folding of the backrest 4 forward, beyond its dead center point, onto a part of the seat that is not shown or onto the cargo compartment floor or into a recess in the cargo compartment floor or the like.

Here, FIG. 3 starts from the position of the components of the backrest folding mechanism in FIG. 2, with it being evident from the bottom image in FIG. 3 that the lever 7 has been pivoted further about the axis of rotation 7A by additional, now somewhat stronger, higher-force pulling, than in the first unlocking step. The application of greater force than in the first unlocking step is necessary to tip the backrest 4 out of the slightly tilted position into the vertical V and beyond its dead center point forward in the x direction. The Bowden cable core 2C of the first Bowden cable 2 is pulled further to carry out the second step, fold initiation, as shown in FIG. 3.

As was explained with reference to FIG. 2, the derailleur pulley 3, limited by the stop in the second slot 3B, cannot be rotated any further in the clockwise direction. However, since on the one hand the first Bowden cable 2 is rigidly fastened at its Bowden cable jacket 2B to the backrest 4 via the Bowden cable connection 2A and on the other hand is connected firmly by its Bowden cable core 2C to the derailleur pulley 3, further pulling of the Bowden cable core 2C by means of the lever 7 has the result that the backrest 4 pivots forward in the x direction, about the backrest folding axle 1C fixed to the car body. An introduction of force by means of the Bowden cable connection 2A to the backrest 4 takes place, which as a result is pivoted forward in the direction of travel. However, the Bowden cable connection 2A at the backrest 4 is displaced only insignificantly to the position 2A" in the process.

While the stud 4A that is fixed to the backrest is still located inside the first, top slot 3A in the position 4A' in FIG. 2 after the first step, the unlocking step, and does not yet constitute a side stop there due to the folding forward of the backrest 4 beyond the vertical V, into the position of the backrest axis L", the stud 4A in FIG. 3 that is fixed to the backrest is now located at the left-hand end of the first, top slot 3A, and constitutes a stop there. Thus in FIG. 3, the stud 4A that is fixed to the backrest assumes the position 4A" in the first, top slot 3A. The Bowden cable connection 5E of the second Bowden cable 5 remains unchanged in its location in the position 5E' in FIG. 3. However, as a result of the folding of the backrest 4, at the same time a further shortening, although minor, of the Bowden cable core 5C at the Bowden cable connection 5D of the second Bowden cable 5 takes place between the Bowden cable connections 5D, 5E, with the Bowden cable consequently assuming the position 5D". As can be seen in FIG. 3, as a result the latch striker 6 pivots further about its axis and opens further, and ultimately assumes the position 6". However, this opening motion is no longer necessary for unlocking of the backrest 4 with respect to the car body.

As is also evident from FIG. 3, the backrest axis L of the backrest 4 has now been moved forward in the x direction, as compared to the position in FIG. 2, into the position L2".

Figure 4:
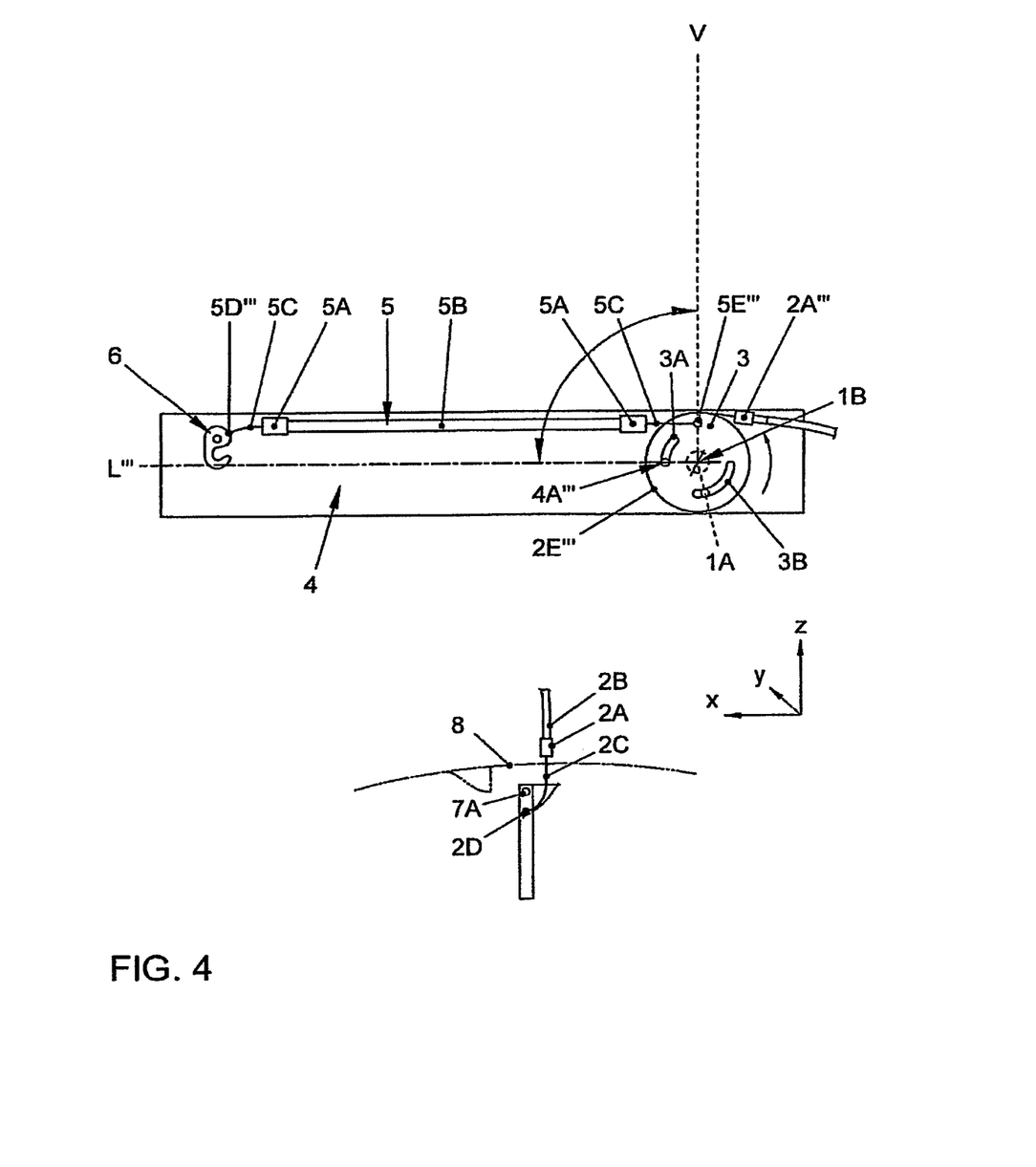
FIG. 4 is a schematic side view of the backrest with the remotely unlockable backrest folding mechanism after a third step after the backrest has been folded over, and FIG. 5 a schematic side view of the backrest with the remotely unlockable backrest folding mechanism after a fourth step after release of the unlocking lever prior to raising the backrest.

The center of gravity of the backrest 4 has thus been displaced beyond its dead center point, whereupon gravity now moves the backrest 4 into the position shown in FIG. 4. Thus, after unlocking and fold initiation, a folding of the backrest 4 is possible without a supporting spring element.

FIG. 4 shows a schematic side view of the backrest 4 with the remotely unlockable backrest folding mechanism following a third step, after the backrest 4 has been folded over with the assistance of gravity.

The gravity-assisted folding over of the backrest 4 in the third step into the essentially horizontal position has the result that the stud 4A on the backrest now carries the derailleur pulley 3 along counterclockwise, out of the position 4A", causing the stud on the backrest to reach the position 4A''', since the backrest 4 folds over into the horizontal position with its backrest axis in the position L''', with the Bowden cable connection 5E of the second Bowden cable 5 on the derailleur pulley 3 now simultaneously likewise being displaced counterclockwise into the position 5E''', coming directly from the position 5E' shown in FIGS. 2 and 3.

However, during the folding step the distance between the Bowden cable connections of the Bowden cable core 5C does not change from the positions 5D", 5E" as in FIG. 3 as compared to the positions 5D''', 5E'''. In the region of the latch striker 6, only the position of the Bowden cable connection 5D changes, which assumes the position 5D'''. The Bowden cable connection 5E assumes the position 5E''', in which process the derailleur pulley 3 shifts a little with respect to the backrest 4, as can be seen by comparing FIGS. 3 and 4 and noting the change in position 5E' and 5E''' of the Bowden cable connection 5E.

After the backrest 4 has been tipped over into the horizontal position L''', the stud 4A on the backrest continues to constitute the left-hand stop in the first, top slot 3A, with the stud 4A on the backrest now, after the folding, being in the position 4A'". At the same time, with the backrest 4 in the horizontal position, due to the rotation of the derailleur pulley 3 in the counterclockwise direction, the stud 1A on the car body is located further to the left in the second, bottom slot 3B as compared to FIG. 3, but does not yet constitute a stop there. The Bowden cable connection 2E on the derailleur side of the Bowden cable core 2C of the second Bowden cable 2, together with the derailleur pulley 3, is likewise rotated further in the clockwise direction out of the position 2E' as a function of the folding motion of the backrest 4, and now assumes the position 2E'" (coming from the position 2E' shown in FIGS. 2, 3). An arrow on the right side next to the derailleur pulley 3 is intended to illustrate this process occurring within the third step as shown in FIG. 4.

As already mentioned in connection with the description of the starting position of the backrest 4 with respect to FIG. 1, the latch striker 6 is arranged to be rotatable about its axis of rotation with spring support, wherein the spring force of a spring element always acts to push the latch striker 6 counter to its direction of unlocking into its original locking position.

Figure 5:
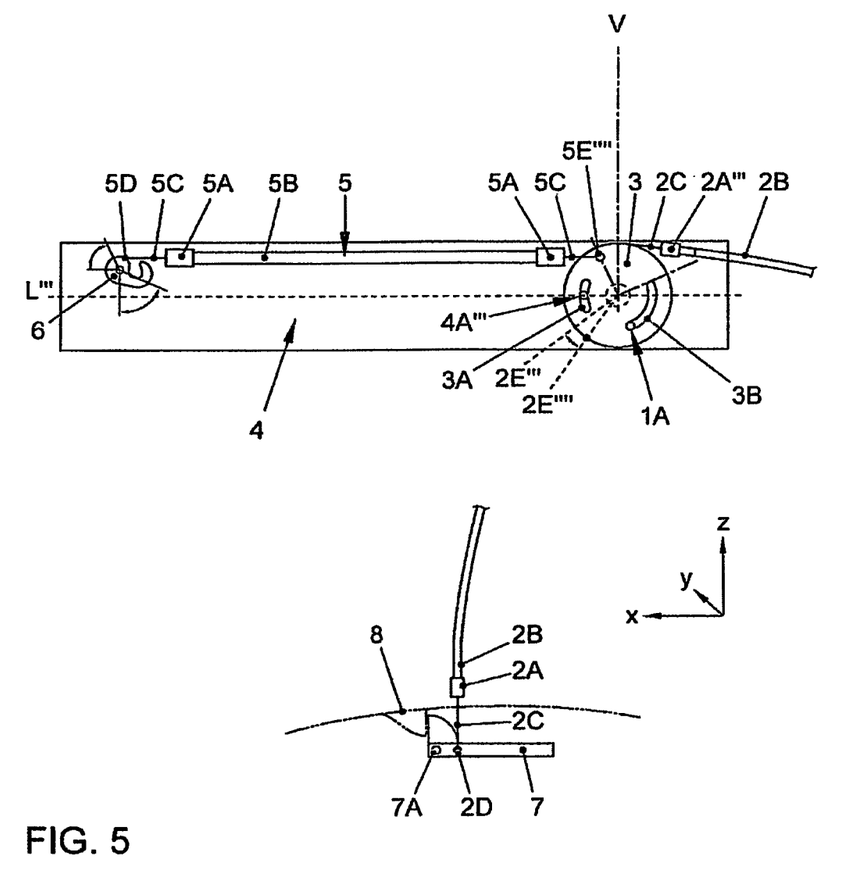

FIG. 5 shows, in a fourth step, the mode of operation of the backrest folding mechanism after the lever 7 has been released by the user, which causes the latch striker 6 to return to its starting position shown in FIG. 1 due to counterclockwise, spring-assisted rotation relative to the backrest 10. With its stop, the lever 7 again assumes the initial position at the stop on the car body intended for renewed operation as shown in the bottom of FIG. 5, which thus corresponds to the starting position in FIG. 1.

During spring-assisted, counterclockwise rotation of the latch striker 6, the Bowden cable core 5C of the second Bowden cable 5 on the derailleur pulley 3 shortens, so that the Bowden cable connection 5E on the derailleur end assumes the position 5E"". This causes the derailleur pulley 3 to rotate one more time in the counterclockwise direction, so that the Bowden cable core 2C on the derailleur end lengthens further, causing the Bowden cable connection 2E on the derailleur end of the second Bowden cable 2 to assume the position 2E"". The stud 1A that is fixed to the car body now forms a left-hand stop in the second slot 3B. In contrast, the stud 4A on the backrest ultimately is no longer located against the left-hand stop of the first slot 3A, as shown in FIG. 4, but instead is nearly in the center of the first slot 3A of the derailleur pulley 3, as shown in FIG. 5.

Once the lever 7 has been released within the fourth step, the raising of the backrest 4 back to the initial position from FIG. 1 can take place in a fifth step, for which purpose the backrest 4 itself is gripped on a handle that is not shown and is folded back—counter to the folding direction—about the backrest fold axle 1B.

When the backrest 4 is pivoted back in the clockwise direction about the backrest fold axle 1B (not shown), on the one hand the Bowden cable core 2C, and on the other hand also the Bowden cable jacket 2B running on the Bowden cable core 2C connected to the backrest 4 through the Bowden cable connection 2A, returns to its starting position 2A (FIG. 1) from the position 2A'" (FIGS. 4 and 5). During raising of the backrest 4, the Bowden cable core 2C attempts to lengthen on the derailleur side, but this is not possible since the lever 7 has already arrived at its starting position as shown in FIGS. 1 and 5. As a result, when the backrest 4 is raised, the derailleur pulley 3 is perforce carried along in the clockwise direction immediately when raising of the backrest 4 is started, regardless of the stud 4A on the backrest located in the first, top slot 3A, the position of which stud inside the slot 3A does not change during the raising process. In contrast, the stud 1A fixed to the car body passes through the second, bottom slot 3B when the backrest 4 is raised. After raising of the backrest, the first and second slots 3A, 3B of the derailleur pulley 3 are once again in the position shown in FIG. 1, with the applicable studs 1A, 4A located inside the slots 3A, 3B in their starting positions, as shown in FIG. 1.

The precise end position of the backrest, which is to say the installation position of the backrest 4 intended for sitting, is determined by the locking studs that are fixed to the body, which are not shown; starting from its backward-displaced position from FIG. 5, the latch striker 6 snaps into these locking studs in opposition to the force of the spring element in the locking studs.

It is evident from FIGS. 1 through 5 that the lateral attachment of the derailleur pulley 3, which can be made to be very slim, is especially space-saving in nature. No folding spring for tipping the backrest 4, which requires a relatively large amount of space, is needed in this solution.

It is thus possible to dispense with a relatively large folding spring that of necessity would be sturdy and expensive for the requisite transmission of force.

Moreover, operation by means of the lever 7 advantageously can be accomplished from a position anywhere in the vehicle that is chosen by the user and is easily reached, wherein, starting from a possible arrangement that is close to the backrest 4, a displacement far toward the back into the trunk of the first Bowden cable 2 and the lever 7 located thereon is just as possible as a displacement far forward to the driver's seat or passenger seat.

As described, forces that are required during the backrest folding are not constant over the folding angle, and in some cases fluctuate very strongly. In places, very high forces are needed. The backrest folding mechanism according to the invention has the advantage that fluctuations with regard to the required forces can, by the transmission of force from the lever 7 through the second Bowden cable 5 to the derailleur pulley 3, and from there to the backrest 4, be adapted to the fluctuations by means of the application of force that can be provided manually, wherein, moreover, an energy-saving solution has been produced by means of the pulley-like implementation.

The direction of operation of the lever 7 for accomplishing the folding movement, as generally is customary in the vehicle in the x direction, is freely selectable in three-dimensional space, so that a displacement of the lever 7 is possible in any of the three directions in space, or even between them.

The following modifications of the remotely unlockable backrest folding mechanism are not shown.

Instead of a circular derailleur pulley 3, a derailleur pulley 3 with a variable radius may be used. In this way, the high initial forces, especially during the second step of fold initiation to fold the backrest 4 forward out of the rearward tilted position, beyond its dead center point, into the position L" from FIG. 3, can be accomplished more easily.

Instead of the first Bowden cable 2, which is responsible for initiating the first and second steps, a motor drive that drives the derailleur pulley 3 through a back-drivable transmission could also be used.

The locking unit of the backrest 4 can be implemented such that when the backrest latch is unlocked, the latch striker 6 that serves as the locking and unlocking element folds the backrest 4 a few degrees forward in that the latch striker 6, 6' presses against the stud fixed to the car body in the first unlocking step due to its rotation.

In addition, in an alternative embodiment the backrest 4 could be pretensioned with a coil spring, so that in contrast to the foregoing description the folding motion, in combination with the described backrest folding mechanism, in a first variant initiates folding at least with spring assistance and folds with gravity assistance or, in a second variant, initiates folding with spring assistance and folds with spring assistance and gravity assistance.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A backrest folding mechanism for a vehicle seat with a backrest, the backrest folding mechanism comprising:
    a locking and unlocking element;
    an actuating element arranged at a distance from the backrest and configured to act on the backrest folding mechanism in order to remotely unlock the locking and unlocking element of the backrest with regard to a retaining element on a vehicle body that is operatively connectable with the locking and unlocking element, after which the backrest is configured to be brought from an initial position that is essentially vertical or slightly inclined from a vertical into a folded position; and
    a first Bowden cable, wherein, in an unlocking step, a displacement of the actuating element initially acts via the first Bowden cable on a pulley arranged on the backrest, which simultaneously carries along a pulling element located between the pulley and the locking and unlocking element and remotely unlocks the backrest, still in its initial position, after which a further displacement of the actuating element in a backrest fold initiation step continues to act on the pulley via the first Bowden cable such that the pulley carries the backrest along beyond its vertical dead center point with the result that the backrest is tipped over into a folded position in a subsequent folding step.

2. The backrest folding mechanism according to claim 1, wherein the pulley is arranged at a side of the backrest on an axle fixed to the vehicle body and substantially perpendicular to the direction of travel, and wherein the pulley is arranged to be freely rotatable within certain limits relative to the vehicle body and relative to the backrest.

3. The backrest folding mechanism according to claim 2, wherein the pulley comprises a first top slot in which a first stud fixed with respect to the backrest engages, wherein the pulley comprises a second bottom slot in which a second stud fixed with respect to the vehicle body engages, and wherein during the actuation of the backrest folding mechanism the first and second studs each constitute stops on two sides in the associated slots that limit a rotation of the pulley relative to the vehicle body and relative to the backrest.

4. The backrest folding mechanism according to claim 1, wherein the Bowden cable core of the first Bowden cable is connectable via Bowden cable connections to the actuating element and to the pulley, wherein a Bowden cable jacket, of the first Bowden cable is fastened to the pivotable backrest via at least one Bowden cable attachment.

5. The backrest folding mechanism according to claim 1, wherein the pulling element is a second Bowden cable, wherein a Bowden cable core of the second Bowden cable is connectable via Bowden cable connections to the locking and unlocking element and to the pulley, and wherein a Bowden cable jacket of the second Bowden cable is fastened to the pivotable backrest via at least one Bowden cable attachment.

6. The backrest folding mechanism according to claim 1, wherein an actuation direction of the actuating element is freely selectable in three-dimensional space and also is independent of the direction of folding of the backrest, and wherein the pulley redirects the force and direction of force of the first Bowden cable to the locking and unlocking element via the pulley and the pulling element and redirects the force and direction of force of the first Bowden cable to the backrest via the studs engaging slots in the pulley.

7. The backrest folding mechanism according to claim 1, wherein the backrest is a one-part or multi-part rear backrest.

8. The backrest folding mechanism according to claim 1, wherein the actuating element is a lever.

9. The backrest folding mechanism according to claim 1, wherein the actuating element is positioned on the vehicle body.

10. The backrest folding mechanism according to claim 1, wherein the pulley comprises a first top slot in which a first stud fixed with respect to the backrest engages.

11. The backrest folding mechanism according to claim 10, wherein the pulley comprises a second bottom slot in which a second stud fixed with respect to the vehicle body engages.

12. The backrest folding mechanism according to claim 11, wherein during the actuation of the backrest folding mechanism the first and second studs each constitute stops on two sides in the associated slots that limit a rotation of the pulley relative to the vehicle body and relative to the backrest.

13. The backrest folding mechanism according to claim 10, wherein during the actuation of the backrest folding mechanism the first stud constitutes a stop that limits a rotation of the pulley relative to the vehicle body and relative to the backrest.

14. The backrest folding mechanism according to claim 1, wherein the pulling element comprises a second Bowden cable.

15. The backrest folding mechanism according to claim 14, wherein a Bowden cable core of the second Bowden cable is connectable via Bowden cable connections to the locking and unlocking element and to the pulley.

16. The backrest folding mechanism according to claim 14, wherein a Bowden cable jacket of the second Bowden cable is fastened to the pivotable backrest via at least one Bowden cable attachment.

17. The backrest folding mechanism according to claim 1, wherein an actuation direction of the actuating element is freely selectable in three-dimensional space.

18. The backrest folding mechanism according to claim 1, wherein an actuation direction is independent of the desired direction of an unlocking motion of the locking and unlocking element relative to the retaining element.

19. The backrest folding mechanism according to claim 1, wherein an actuation direction is independent of the direction of folding of the backrest.

20. The backrest folding mechanism according to claim 1, wherein the pulley redirects a force and a direction of force of the first Bowden cable to the locking and unlocking element via the pulley and the pulling element and redirects the force and direction of force of the first Bowden cable to the backrest via studs engaging slots in the pulley.

21. A vehicle seat, comprising:
    a backrest; and
    a backrest folding mechanism, comprising:
        a locking and unlocking element;
        an actuating element arranged at a distance from the backrest and configured to act on the backrest folding mechanism in order to remotely unlock the locking and unlocking element of the backrest with regard to a retaining element on a vehicle body that is operatively connectable with the locking and unlocking element, after which the backrest is configured to be brought from an initial position that is essentially vertical or slightly inclined from a vertical into a folded position; and a first Bowden cable, wherein, in an unlocking step, a displacement of the actuating element initially acts via the first Bowden cable on a pulley arranged on the backrest, which simultaneously carries along a pulling element located between the pulley and the locking and unlocking element and remotely unlocks the backrest, still in its initial position, after which a further displacement of the actuating element in a backrest fold initiation step continues to act on the pulley via the first Bowden cable such that the pulley carries the backrest along beyond its vertical dead center point with the result that the backrest is tipped over into a folded position in a subsequent folding step.

\* \* \* \* \*